(12) United States Patent
Zhao et al.

(10) Patent No.: US 11,285,574 B2
(45) Date of Patent: Mar. 29, 2022

(54) MAGNETIC-HYDRAULIC DOUBLE-SUSPENSION BEARING EXPERIMENT TABLE

(71) Applicant: Yanshan University, Qinhuangdao (CN)

(72) Inventors: Jianhua Zhao, Qinhuangdao (CN); Yongqiang Wang, Qinhuangdao (CN); Ziqi Wang, Qinhuangdao (CN); Dianrong Gao, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 0 days.

(21) Appl. No.: 17/104,077

(22) Filed: Nov. 25, 2020

(65) Prior Publication Data
US 2021/0154783 A1    May 27, 2021

(30) Foreign Application Priority Data
Nov. 26, 2019 (CN) .......................... 201911175321.4

(51) Int. Cl.
*F16C 32/04* (2006.01)
*B23Q 1/38* (2006.01)
*F16C 32/06* (2006.01)

(52) U.S. Cl.
CPC .......... *B23Q 1/38* (2013.01); *F16C 32/0402* (2013.01); *F16C 32/0465* (2013.01); *F16C 32/0662* (2013.01)

(58) Field of Classification Search
CPC .............. F16C 32/0402; F16C 32/0425; F16C 32/0434; F16C 32/0472; F16C 32/0662; F16C 32/0465; B23Q 1/25; B23Q 1/38
See application file for complete search history.

(56) References Cited

U.S. PATENT DOCUMENTS

| 4,141,604 A * | 2/1979 | Habermann .......... F04D 29/053 |
| | | 310/90.5 |
| 2005/0275300 A1* | 12/2005 | El-Shafei ................ F16C 17/02 |
| | | 310/90.5 |

FOREIGN PATENT DOCUMENTS

| CN | 107237820 A | * 10/2017 | |
| CN | 108050158 A | * 5/2018 | |
| CN | 108547869 B | * 9/2019 | |
| DE | 102013000551 A1 | * 7/2014 | ............... H02K 7/09 |

(Continued)

*Primary Examiner* — Phillip A Johnson
(74) *Attorney, Agent, or Firm* — IPro, PLLC; Na Xu

(57) ABSTRACT

The present invention provides a magnetic-hydraulic double-suspension bearing experiment table. In the experiment table, four blind holes are uniformly processed on left and right side surfaces of the two radial stators for magnetic-hydraulic double-suspension bearing; four countersunk through holes are uniformly processed on left side surfaces of the left supporting part of the fixed bracket and the right supporting part of the fixed bracket, and the radial stators for magnetic-hydraulic double-suspension bearing are fixedly connected to the upper end of the left supporting part of the fixed bracket by countersunk screws. In addition, the two radial stators for magnetic-hydraulic double-suspension bearing are processed with stops to ensure that the two radial stators for magnetic-hydraulic double-suspension bearing are concentric with the left supporting part of the fixed bracket and the right supporting part of the fixed bracket.

5 Claims, 5 Drawing Sheets

(56) References Cited

FOREIGN PATENT DOCUMENTS

| JP | H06200937 A | * | 6/1994 | |
|---|---|---|---|---|
| JP | 2000024805 A | * | 1/2000 | .......... F16C 32/0402 |
| JP | 2006062081 A | * | 3/2006 | .......... F16C 32/0402 |

* cited by examiner

US 11,285,574 B2

MAGNETIC-HYDRAULIC DOUBLE-SUSPENSION BEARING EXPERIMENT TABLE

TECHNICAL FIELD

The present invention relates to the design field of a magnetic-hydraulic double-suspension bearing, in particular to a magnetic-hydraulic double-suspension bearing experiment table.

BACKGROUND

The magnetic-hydraulic double-suspension bearing adopts the dual support of electromagnetic force and hydrostatic support force. It is a new type of non-mechanical contact bearing, which has the advantages of no friction, no wear, large bearing capacity, high movement accuracy, and long service life. Therefore, it has been widely valued and widely used. For installation, a left radial end cover for magnetic-hydraulic double-suspension bearing and a radial stator for magnetic-hydraulic double-suspension bearing and an axial system for magnetic-hydraulic double-suspension bearing are connected in sequence in the existing magnetic-hydraulic double-suspension bearing experiment table, and are connected to the left supporting part of the fixed bracket by long bolts. A right radial end cover for magnetic-hydraulic double-suspension bearing and a radial stator for magnetic-hydraulic double-suspension bearing and a right radial end sealing-cap for magnetic-hydraulic double-suspension bearing are connected in sequence, and are connected to the right supporting part of the fixed bracket by long bolts. The above connection method will increase the amount of coaxiality error, because the large number of right mounting parts of the left supporting part of the fixed bracket and the right supporting part of the fixed bracket will cause the amount of eccentricity becomes larger and the connection of each component through the stop from left to right will also increase the concentricity error of the magnetic-hydraulic double-suspension bearing experiment table.

SUMMARY

The technical problem to be solved by the present invention is to reduce the coaxiality error of the existing magnetic-hydraulic double-suspension bearing experiment table system due to assembly processing errors, thereby improving the motion characteristics of the magnetic-hydraulic double-suspension bearing experiment table system.

To solve the above technical problems, the present invention proposes a magnetic-hydraulic double-suspension bearing experiment table, comprising: a fixed bracket, a motor, a coupling, a bell hood, a left radial end cover for magnetic-hydraulic double-suspension bearing, two radial stators for magnetic-hydraulic double-suspension bearing, an axial system for magnetic-hydraulic double-suspension bearing, a radial vibration device, a main shaft, a right radial end cover for magnetic-hydraulic double-suspension bearing, a right radial end sealing-cap for magnetic-hydraulic double-suspension bearing, an axial vibration device, a sealing cap, and a bracket seal.

The fixed bracket comprises a left supporting part of the fixed bracket and a right supporting part of the fixed bracket, and the left supporting part of the fixed bracket and the right supporting part of the fixed bracket are concentric.

The motor is fixedly mounted on an outer left side of the bell hood, and a motor shaft of the motor passes through a left side of the bell hood to enter an interior of the bell hood and is connected to the coupling to provide torque for the main shaft.

The coupling is inside the bell hood, a left end of the coupling is connected to the motor shaft, and a right end of the coupling is connected to the main shaft to transmit torque to the main shaft.

The bell hood is fixedly connected to a left side surface of the left supporting part of the fixed bracket.

Four blind holes are uniformly processed on left and right side surfaces of the two radial stators for magnetic-hydraulic iii double-suspension bearing; four countersunk through holes are uniformly processed on left side surfaces of the left supporting part of the fixed bracket and the right supporting part of the fixed bracket, the radial stator for magnetic-hydraulic double-suspension bearing on the left is fixedly connected to right side of an upper end of the left supporting part of the fixed bracket by countersunk screws, and the radial stator for magnetic-hydraulic on the right is fixedly connected to the right side of the upper end of the right supporting part of the fixed bracket by countersunk screws, the two radial stators for magnetic-hydraulic double-suspension bearing are processed with stops to ensure that the two radial stators for magnetic-hydraulic double-suspension bearing is concentric with the left supporting part of the fixed bracket and the right supporting part of the fixed bracket; the main shaft passes through the two radial stators for magnetic-hydraulic double-suspension bearing, thereby providing a suspended radial support force to the main shaft.

An outer diameter of the bracket seal is respectively in interference fit with through holes of the left radial end cover for magnetic-hydraulic double-suspension bearing, the right radial end cover for magnetic-hydraulic double-suspension bearing, and the right radial end sealing-cap for magnetic-hydraulic double-suspension bearing, and the main shaft passes through the bracket seal.

The left radial end cover for magnetic-hydraulic double-suspension bearing is fixedly connected to left side of an upper end of the left supporting part of the fixed bracket, the sealing cap is processed with a through hole, and an inner diameter of the through hole is larger than the outer diameter of the main shaft but is smaller than the outer diameter of the bracket seal, and is mounted on the left side of the left radial end cover for magnetic-hydraulic double-suspension bearing by screws, and is used in conjunction with the left radial end cover for magnetic-hydraulic double-suspension bearing to prevent the bracket seal from being extruded from the left side under pressure, thereby playing a role of sealing and fixing.

The axial system for magnetic-hydraulic double-suspension bearing is fixedly connected to a right side of the radial stator for magnetic-hydraulic double-suspension bearing on the left to provide axial support for the main shaft and to fix and seal the right side of the radial stator for magnetic-hydraulic double-suspension bearing on the left.

An upper end of the radial vibration device has an annular through hole, and the main shaft passes through the annular through hole to provide a radial load for the magnetic-hydraulic double-suspension bearing experiment table.

The right radial end cover for magnetic-hydraulic double-suspension bearing is fixedly connected to the left side surface of the right supporting part of the fixed bracket, the sealing cap is processed with a through hole, and an inner diameter of the through hole is larger than the outer diameter of the main shaft but is smaller than the outer diameter of the bracket seal, and is mounted on the left side of the right radial end cover for magnetic-hydraulic double-suspension bearing by screws, and the two are used in conjunction to prevent the bracket seal from being extruded from the left side under pressure, thereby playing a role of sealing and fixing.

The right radial sealing-cap for magnetic-hydraulic double-suspension bearing is fixedly connected to the right side surface of the radial stator for magnetic-hydraulic double-suspension bearing at the right, the sealing cap is processed with a through hole, and an inner diameter of the through hole is larger than the outer diameter of the main shaft but is smaller than the outer diameter of the bracket seal, and is mounted on the right side of the right radial end sealing-cap for magnetic-hydraulic double-suspension bearing by screws, and is used in conjunction with the right radial end sealing-cap for magnetic-hydraulic double-suspension bearing to prevent the bracket seal from being extruded from the right side under pressure, thereby playing a role of sealing and fixing.

The axial vibration device is connected to the right end of the main shaft to provide an axial load for the main shaft.

The first end of the main shaft is fixedly connected to the motor shaft through the coupling, and the second end is connected to the axial vibration device, to output torque from a magnetic-hydraulic double-suspension bearing experiment table.

Preferably, four blind holes are uniformly processed on left and right side surfaces of the radial stator for magnetic-hydraulic double-suspension bearing; four countersunk through holes are uniformly processed on the left supporting part of the fixed bracket and the right supporting part of the fixed bracket, the radial stator for magnetic-hydraulic double-suspension bearing is respectively connected to the left supporting part of the fixed bracket and the right supporting part of the fixed bracket.

Preferably, one side of the radial stator for magnetic-hydraulic double-suspension bearing is processed with a stop that cooperates with the left supporting part of the fixed bracket and the right supporting part of the fixed bracket, and the stop is used to ensure the radial stator for magnetic-hydraulic double-suspension bearing is concentric with the left supporting part of the fixed bracket and the right supporting part of the fixed bracket.

Preferably, four blind holes are uniformly processed on the left supporting part of the fixed bracket and the right supporting part of the fixed bracket; four through holes are uniformly processed on the left radial end cover for magnetic-hydraulic double-suspension bearing and the right radial end cover for magnetic-hydraulic double-suspension bearing, the left radial end cover for magnetic-hydraulic double-suspension bearing and the right radial end cover for magnetic-hydraulic double-suspension bearing are respectively connected to the left supporting part of the fixed bracket and the right supporting part of the fixed bracket by screws.

Preferably, four through holes are uniformly processed on the bell hood and the left radial end cover for magnetic-hydraulic double-suspension bearing, and the bell hood and the left radial end cover for magnetic-hydraulic double-suspension bearing are fixedly connected to the blind holes of the left supporting part of the fixed bracket by long screws.

Preferably, four notches are uniformly processed on the bell hood and the left radial end cover for magnetic-hydraulic double-suspension bearing to facilitate disassembling of the countersunk screws for fixing the radial stator for magnetic-hydraulic double-suspension bearing on the left to the left supporting part of the fixed bracket.

Compared with the prior art, the present invention has the following beneficial effects.

Four blind holes are uniformly processed on left and right side surfaces of the two radial stators for magnetic-hydraulic double-suspension bearing; four countersunk through holes are uniformly processed on left side surfaces of the left supporting part of the fixed bracket and the right supporting part of the fixed bracket, and the radial stators for magnetic-hydraulic double-suspension bearing are fixedly connected to the upper end of the left supporting part of the fixed bracket by countersunk screws. In addition, the two radial stators for magnetic-hydraulic double-suspension bearing are processed with stops to ensure that the two radial stators for magnetic-hydraulic double-suspension bearing are concentric with the left supporting part of the fixed bracket and the right supporting part of the fixed bracket. As a result, the coaxiality of the radial stator for magnetic-hydraulic double-suspension bearing is only related to the coaxiality errors of the left supporting part of the fixed bracket and the right supporting part of the fixed bracket. Therefore, the assembly processing method of the present invention reduces the coaxiality error caused by assembly processing errors between the various components of the magnetic-hydraulic double-suspension bearing system.

REFERENCE SIGNS IN FIGURES

1—motor, 2—coupling, 3—bell hood, 4—left radial end cover for magnetic-hydraulic double-suspension bearing, 5—left supporting part of the fixed bracket, 6—radial stator for magnetic-hydraulic double-suspension bearing, 7—axial system for magnetic-hydraulic double-suspension bearing, 8—radial vibration device, 9—main shaft, 10—right radial end cover for magnetic-hydraulic double-suspension bearing, 11—right supporting part of the fixed bracket, 12—right radial end sealing-cap for magnetic-hydraulic double-suspension bearing, 13—axial vibration device, 14—sealing cap, 15—bracket blind hole, 16—counterbore through hole, 17—stator blind hole, 18—stator stop, 19—bracket seal, 20—through hole A, 21—stop A, 22—notch A, 23—through hole B, 24—blind hole B, 25—stop B1, 26—stop B2, 27—through hole C, 28—blind hole C, 29—stop C, 30—sealing-cap through hole, 31—through hole D, 32—blind hole D, 33—stop D, 34—notch B, 35—threaded through hole E1, and, 36—threaded through hole E2.

DETAILED DESCRIPTION OF EMBODIMENTS

Hereinafter, embodiments of the present invention will be described with reference to the drawings.

Figure 1:
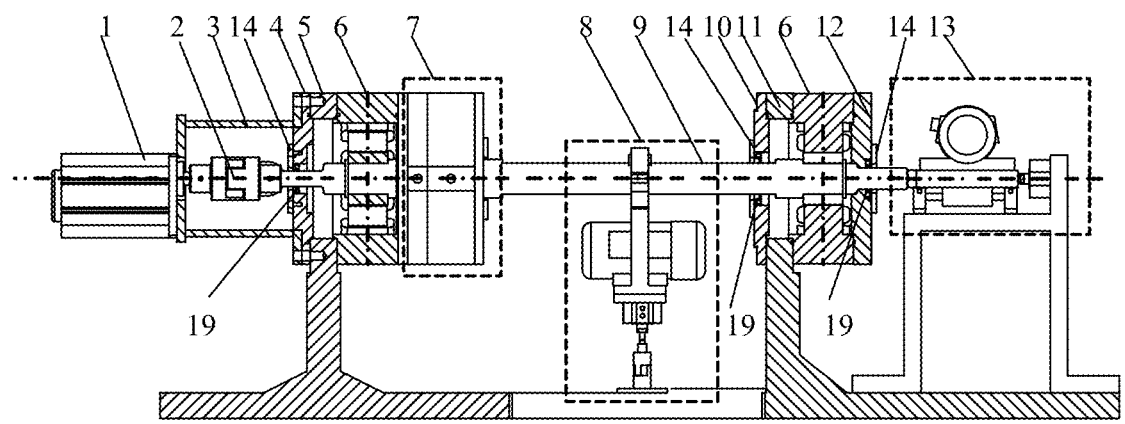
FIG. 1 is a schematic diagram of a magnetic-hydraulic double-suspension bearing experiment table system in an embodiment of the present invention.

As shown in FIG. 1, a magnetic-hydraulic double-suspension bearing experiment table provided by an embodiment of the present invention comprises: a fixed bracket, a motor 1, a coupling 2, a bell hood 3, a left radial end cover 4 for magnetic-hydraulic double-suspension bearing, radial stators 6 for magnetic-hydraulic double-suspension bearing, an axial system 7 for magnetic-hydraulic double-suspension bearing, a radial vibration device 8, a main shaft 9, a right radial end cover 10 for magnetic-hydraulic double-suspension bearing, a right end sealing-cap 12 for radial magnetic-hydraulic double-suspension bearing, an axial vibration device 13, a sealing cap 14, and a bracket seal 19.

The fixed bracket comprises a left supporting part 5 of the fixed bracket and a right supporting part 11 of the fixed bracket, and the left supporting part 5 of the fixed bracket and the right supporting part 11 of the fixed bracket are concentric.

Figure 10:
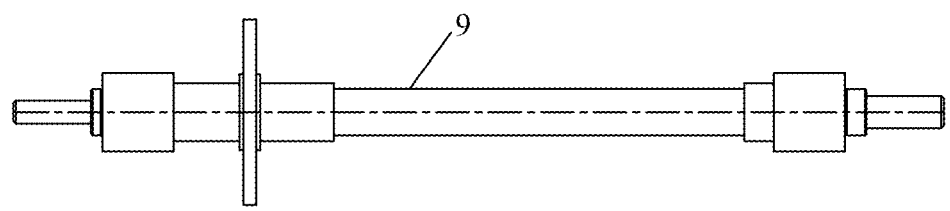
FIG. 10 is a front view of a main shaft in the embodiment of the present invention.

The motor 1 is fixedly mounted on an outer left side of the bell hood 3, and a motor shaft of the motor passes through a left side of the bell hood 3 to enter an interior of the bell hood 3 and is connected to the coupling 2 to provide torque for the main shaft 9 as shown in FIG. 10.

The coupling 2 is inside the bell hood 3, a left end of the coupling 2 is connected to the motor shaft, and a right end of the coupling 9 is connected to the main shaft to transmit torque to the main shaft.

The bell hood 3 is fixedly connected to a left side surface of the left supporting part 4 of the fixed bracket.

The magnetic-hydraulic double-suspension bearing experiment table system provided in the embodiment of the present invention includes two left and right radial stators for magnetic-hydraulic double-suspension bearing 6. The radial stator 6 for magnetic-hydraulic double-suspension bearing on the left is fixedly connected to right side of an upper end of the left supporting part 5 of the fixed bracket by countersunk screws, and the radial stator 6 for magnetic-hydraulic on the right is fixedly connected to the right side of the upper end of the right supporting part 11 of the fixed bracket by countersunk screws, the two radial stators 6 for magnetic-hydraulic double-suspension bearing are concentric with the left supporting part 5 of the fixed bracket and the right supporting part 11 of the fixed bracket; and the main shaft passes through the two radial stators for magnetic-hydraulic double-suspension bearing, thereby providing a suspended radial support force to the main shaft.

An outer diameter of the bracket seal 19 is respectively in interference fit with through holes of the left radial end cover 4 for magnetic-hydraulic double-suspension bearing, the right radial end cover 10 for magnetic-hydraulic double-suspension bearing, and the right end sealing-cap 12 for radial magnetic-hydraulic double-suspension bearing, and the main shaft 9 passes through the bracket seal 19.

The left radial end cover 4 for magnetic-hydraulic double-suspension bearing is fixedly connected to left side of an upper end of the left supporting part 5 of the fixed bracket, the sealing cap 13 is processed with a through hole, and an inner diameter of the through hole is larger than the outer diameter of the main shaft 9 but is smaller than the outer diameter of the bracket seal 19, and is mounted on the left side of the left radial end cover 4 for magnetic-hydraulic double-suspension bearing by screws. The two cooperate to prevent the bracket seal 19 from being extruded from the left side under pressure, thereby playing a role of sealing and fixing.

The axial system 7 for magnetic-hydraulic double-suspension bearing is fixedly connected to a right side of the radial stator 6 for magnetic-hydraulic double-suspension bearing on the left to provide axial support for the main shaft 9 and to fix and seal the right side of the radial stator 6 for magnetic-hydraulic double-suspension bearing on the left.

An upper end of the radial vibration device 8 has an annular through hole, and the main shaft 9 passes through the annular through hole to provide a radial load for the magnetic-hydraulic double-suspension bearing experiment table.

The right radial end cover 10 for magnetic-hydraulic double-suspension bearing is fixedly connected to the left side surface of the right supporting part 11 of the fixed bracket, the sealing cap 14 is processed with a through hole, and an inner diameter of the through hole is larger than the outer diameter of the main shaft 9 but is smaller than the outer diameter of the bracket seal 19, and is mounted on the left side of the right radial end cover 10 for magnetic-hydraulic double-suspension bearing by screws, and the two cooperate to prevent the bracket seal 10 from being extruded from the left side under pressure, thereby playing a role of sealing and fixing.

The right radial sealing-cap 12 for magnetic-hydraulic double-suspension bearing is fixedly connected to the right side surface of the radial stator 6 for magnetic-hydraulic double-suspension bearing at the right, the sealing cap 14 is processed with a through hole, and an inner diameter of the through hole is larger than the outer diameter of the main shaft 9 but is smaller than the outer diameter of the bracket seal 19, and is mounted on the right side of the right end sealing-cap 12 for radial magnetic-hydraulic double-suspension bearing by screws. The two cooperate to prevent the bracket seal 19 from being extruded from the right side under pressure, thereby playing a role of sealing and fixing.

The axial vibration device 13 is connected to the right end of the main shaft to provide an axial load for the main shaft 9.

The first end of the main shaft 9 is fixedly connected to the motor 1 through the coupling 2, and the second end is connected to the axial vibration device 13, to output torque from a magnetic-hydraulic double-suspension bearing experiment table.

Figure 2A:
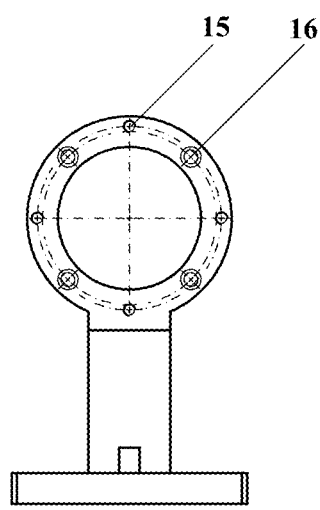
FIG. 2A is a left view of left and right supporting parts of the fixed bracket in the embodiment of the present invention.
Figure 2B:
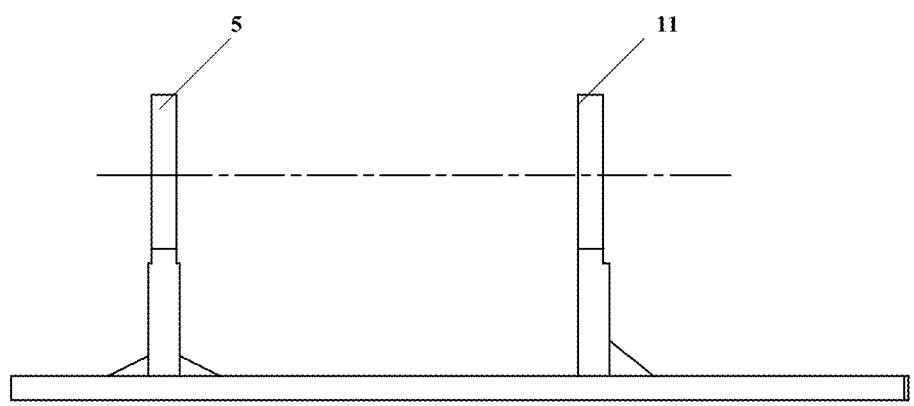
FIG. 2B is a front view of the left and right supporting parts of the fixed bracket in the embodiment of the present invention.

As shown in FIG. 2, four through holes 16 and four bracket blind holes 15 are uniformly processed on the left supporting part 5 of the fixed bracket and the right supporting part 11 of the fixed bracket.

Figure 3A:
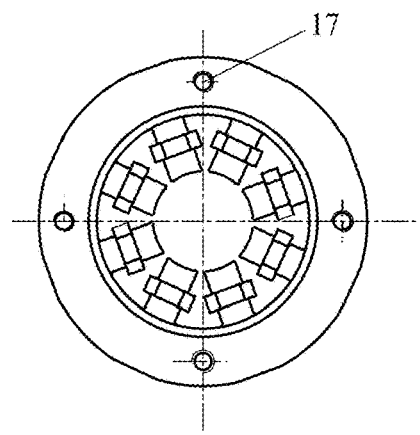
FIG. 3A is a left view of a radial stator for magnetic-hydraulic double-suspension bearing in an embodiment of the present invention.
Figure 3B:
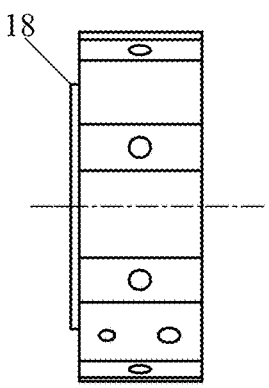
FIG. 3B is a front view of the radial stator for magnetic-hydraulic double-suspension bearing in the embodiment of the present invention.

As shown in FIG. 3, four stator blind holes 17 are uniformly processed on left and right side surfaces of the radial stator 6 for magnetic-hydraulic double-suspension bearing, and one side of the radial stator for magnetic-hydraulic double-suspension bearing is processed with a stator stop 18.

In the present invention, the positioning holes on the left supporting part 5 of the fixed bracket and the right supporting part 6 of the fixed bracket are directly processed by brick cutters, and the coaxiality error is small. The two left and right radial stators 6 for magnetic-hydraulic double-suspension bearing are directly connected to the left supporting part 5 of the fixed bracket and the right supporting part 11 of the fixed bracket through four countersunk screws, so that the coaxiality of the radial stator 6 for magnetic-hydraulic double-suspension bearing is only related to the coaxiality error of the left supporting part 5 of the fixed bracket and the right supporting part 11 of the fixed bracket, and through the left radial end cover 4 for magnetic-hydraulic double-suspension bearing and the right radial end cover 10 for magnetic-hydraulic double-suspension bearing are directly fixed and sealed with the left supporting part 5 of the fixed bracket and the right supporting part 11 of the fixed bracket. Compared with the direct connection of the traditional bearing end cover and the radial stator for magnetic-hydraulic double-suspension bearing, the assembly processing method of the present invention reduces the coaxiality error caused by assembly processing errors between the various components of the magnetic-hydraulic double-suspension bearing system.

Figure 4A:
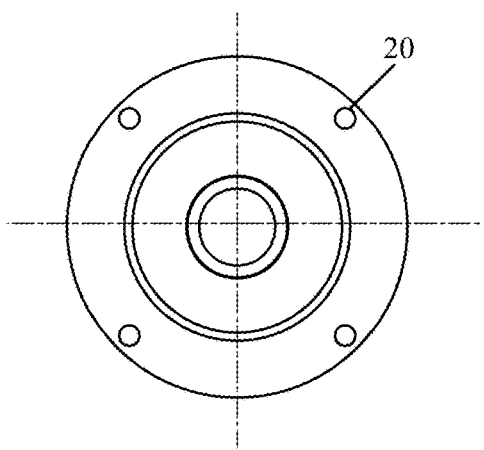
FIG. 4A is a left view of an axial system for magnetic-hydraulic double-suspension bearing in the embodiment of the present invention.
Figure 4B:
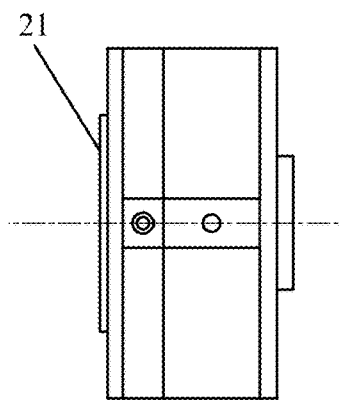
FIG. 4B is a front view of the axial system for magnetic-hydraulic double-suspension bearing in the embodiment of the present invention.

As shown in FIG. 4, four through holes A20 are uniformly processed on the side surface of the axial system 7 for the magnetic-hydraulic double-suspension bearing, and a stop A21 is processed on one side thereof. The radial stator 6 for magnetic-hydraulic double-suspension bearing and the axial system 7 for magnetic-hydraulic double-suspension bearing 7 is fixedly connected by long screws, and the two are concentric through stop A21.

Figure 5A:
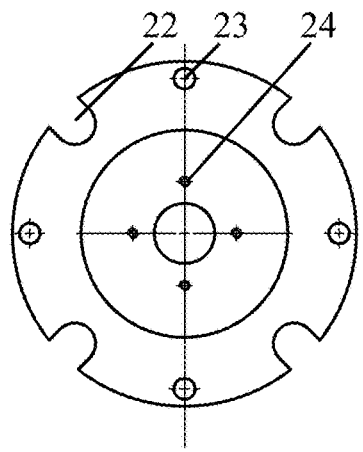
FIG. 5A is a left view of a left radial end cover for magnetic-hydraulic double-suspension bearing in the embodiment of the present invention.
Figure 5B:
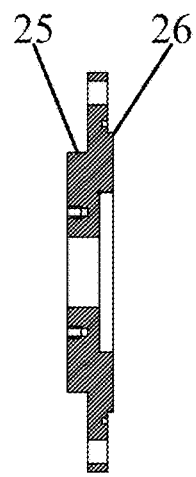
FIG. 5B is a cross-sectional view of the left radial end cover for magnetic-hydraulic double-suspension bearing in the embodiment of the present invention.

As shown in FIG. 5, four through holes B23, four blind holes B24 and four notches A22 are uniformly processed on the side surface of the left radial end cover 4 for magnetic-hydraulic double-suspension bearing, and stop B1 25 and stop B2 26 are processed on its left and right sides. The left radial end cover 4 for magnetic-hydraulic double-suspension bearing is fixedly connected with the left supporting part 5 of the fixed bracket by screws, and concentricity is ensured by stop B2. Four notches A are uniformly processed on the left radial end cover 4 for magnetic-hydraulic The double-suspension bearing 4 for easy removal of screws.

Figure 6:
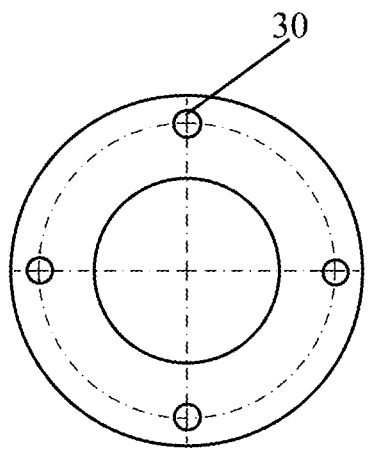
FIG. 6 is a cross-sectional view of a right radial end cover for magnetic-hydraulic double-suspension bearing in an embodiment of the present invention.

As shown in FIG. 6, four through holes C27 and four blind holes C28 are uniformly processed on the side of the right radial end cover 10 for magnetic-hydraulic double-suspension bearing, and a stop C29 is processed on its one side. Right radial end cover 10 for magnetic-hydraulic double-suspension bearing is fixedly connected to the right supporting part 11 of the fixed bracket by screws, and is concentric with stop C29. Four sealing cap through holes 30 are uniformly processed on the side surface of the sealing cap 14, and the sealing cap 14 and the right radial end cover 10 for magnetic-hydraulic double-suspension bearing are fixedly connected by screws.

Figure 7:
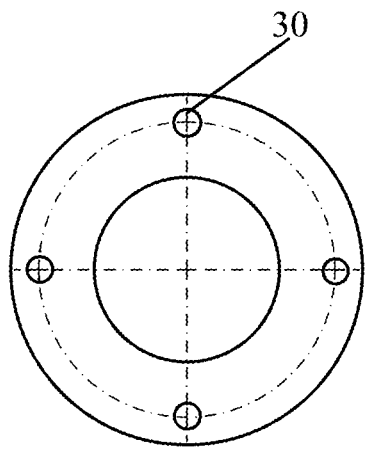
FIG. 7 is a left side view of a sealing cap in the embodiment of the present invention.

As shown in FIG. 7, four sealing cap through holes 30 are uniformly processed on the side surface of the sealing cap 14, and the sealing cap 14 is fixedly connected by screws with the left radial end cover 4 for magnetic-hydraulic double-suspension bearing and the right radial end sealing-cap 12 for magnetic-hydraulic double-suspension bearing.

Figure 8:
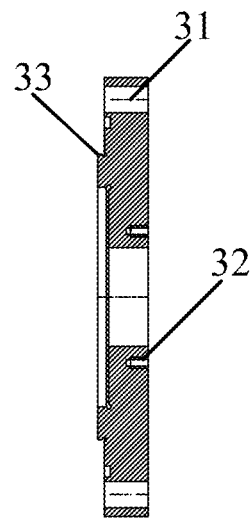
FIG. 8 is a cross-sectional view of a right radial end sealing-cap for magnetic-hydraulic double-suspension bearing in an embodiment of the present invention.

As shown in FIG. 8, four through holes D31 and four blind holes D32 are uniformly processed on the side surface of the right radial end sealing-cap 12 for magnetic-hydraulic double-suspension bearing, and stop D33 is processed on its one side. The right radial end sealing-cap 12 for magnetic-hydraulic double-suspension bearing and the radial stator 6 for magnetic-hydraulic double-suspension bearing are fixedly connected by screws and are concentric with the stop D33. Four sealing cap through holes 30 are uniformly processed on the side surface of the sealing cap 14, and the sealing cap 14 and right radial end sealing-cap 12 for magnetic-hydraulic double-suspension bearing are fixedly connected by screws.

Figure 9:
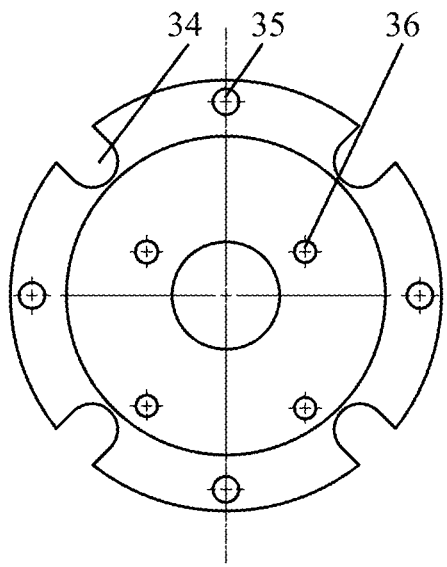
FIG. 9 is a left view of a bell hood in the embodiment of the present invention.

As shown in FIG. 9, four threaded through holes E1 35 and four notches B34 are uniformly processed on the side surface of the bell hood 3, and four threaded through holes E2 36 for fixed connection with motor are processed on the other side thereof. The motor is fixedly connected with the left supporting part 5 of the fixed bracket through long screws, and four notches B34 are uniformly processed on one side of the bell hood 3 to facilitate the removal of the screws.

The embodiment of the present invention provides a novel assembly structure for the magnetic-hydraulic double-suspension bearing experiment table system, which can reduce the coaxiality error of the various components of the magnetic-hydraulic double-suspension bearing experiment table system, thereby ensuring that the magnetic-hydraulic double-suspension bearing experiment table system can operate safely and stably.

The above-mentioned embodiments only describe the preferred embodiments of the present invention and do not limit the scope of the present invention. Without departing from the design spirits of the present invention, those of ordinary skill in the art have made various modifications and improvements to the technical solutions of the present invention. Such modifications and improvements shall fall within the protection scope determined by the claims of the present invention.

What is claimed is:

1. A magnetic-hydraulic double-suspension bearing experiment table, comprising: a fixed bracket, a motor, a coupling, a bell hood, a left radial end cover for a magnetic-hydraulic double-suspension bearing, two radial stators for the magnetic-hydraulic double-suspension bearing, an axial system for the magnetic-hydraulic double-suspension bearing, a radial vibration device, a main shaft, a right radial end cover for the magnetic-hydraulic double-suspension bearing, a right radial end sealing-cap for the magnetic-hydraulic double-suspension bearing, an axial vibration device, a sealing cap, and a bracket seal; wherein the fixed bracket comprises a left supporting part of the fixed bracket and a right supporting part of the fixed bracket, and the left supporting part of the fixed bracket and the right supporting part of the fixed bracket are concentric;

the motor is fixedly mounted on an outer left side of the bell hood, and a motor shaft of the motor passes through a left side of the bell hood to enter an interior of the bell hood and is connected to the coupling to provide torque for the main shaft;

the coupling is inside the bell hood, a left end of the coupling is connected to the motor shaft, and a right end of the coupling is connected to the main shaft to transmit torque to the main shaft;

the bell hood is fixedly connected to a left side surface of the left supporting part of the fixed bracket;

four blind holes are uniformly processed on left and right side surfaces of the two radial stators for the magnetic-hydraulic double-suspension bearing; four countersunk through holes are uniformly processed on left side surfaces of the left supporting part of the fixed bracket and the right supporting part of the fixed bracket, the radial stator for the magnetic-hydraulic double-suspension bearing on the left is fixedly connected to right side of an upper end of the left supporting part of the fixed bracket by countersunk screws, and the radial stator for magnetic-hydraulic on the right is fixedly connected to the right side of the upper end of the right supporting part of the fixed bracket by countersunk screws, the two radial stators for the magnetic-hydraulic double-suspension bearing are processed with stops to ensure that the two radial stators for the magnetic-hydraulic double-suspension bearing are concentric with the left supporting part of the fixed bracket and the right supporting part of the fixed bracket; the main shaft passes through the two radial stators for the magnetic-hydraulic double-suspension bearing, thereby providing a suspended radial support force to the main shaft;

an outer diameter of the bracket seal is respectively in interference fit with through holes of the left radial end cover for the magnetic-hydraulic double-suspension bearing, the right radial end cover for the magnetic-hydraulic double-suspension bearing, and the right radial end sealing-cap for the magnetic-hydraulic double-suspension bearing, and the main shaft passes through the bracket seal;

the left radial end cover for the magnetic-hydraulic double-suspension bearing is fixedly connected to left side of an upper end of the left supporting part of the fixed bracket, the sealing cap is processed with a through hole, and an inner diameter of the through hole is larger than the outer diameter of the main shaft but is smaller than the outer diameter of the bracket seal, and is mounted on the left side of the left radial end cover for the magnetic-hydraulic double-suspension bearing by screws, and is used in conjunction with the left radial end cover for the magnetic-hydraulic double-suspension bearing to prevent the bracket seal from being extruded from the left side under pressure, thereby playing a role of sealing and fixing;

the axial system for the magnetic-hydraulic double-suspension bearing is fixedly connected to a right side of the radial stator for the magnetic-hydraulic double-suspension bearing on the left to provide axial support for the main shaft and to fix and seal the right side of the radial stator for the magnetic-hydraulic double-suspension bearing on the left;

an upper end of the radial vibration device has an annular through hole, and the main shaft passes through the annular through hole to provide a radial load for the magnetic-hydraulic double-suspension bearing experiment table;

the right radial end cover for the magnetic-hydraulic double-suspension bearing is fixedly connected to the left side surface of the right supporting part of the fixed bracket, the sealing cap is processed with a through hole, and an inner diameter of the through hole is larger than the outer diameter of the main shaft but is smaller than the outer diameter of the bracket seal, and is mounted on the left side of the right radial end cover for the magnetic-hydraulic double-suspension bearing by screws, and the right radial end cover for the magnetic-hydraulic double-suspension bearing and the sealing cap are used in conjunction to prevent the bracket seal from being extruded from the left side under pressure, thereby playing a role of sealing and fixing;

the right radial sealing-cap for the magnetic-hydraulic double-suspension bearing is fixedly connected to the right side surface of the radial stator for the magnetic-hydraulic double-suspension bearing at the right, the sealing cap is processed with a through hole, and an inner diameter of the through hole is larger than the outer diameter of the main shaft but is smaller than the outer diameter of the bracket seal, and is mounted on the right side of the right radial end sealing-cap for the magnetic-hydraulic double-suspension bearing by screws, and is used in conjunction with the right radial end sealing-cap for the magnetic-hydraulic double-suspension bearing to prevent the bracket seal from being extruded from the right side under pressure, thereby playing a role of sealing and fixing;

the axial vibration device is connected to the right end of the main shaft to provide an axial load for the main shaft; and the first end of the main shaft is fixedly connected to the motor shaft through the coupling, and the second end is connected to the axial vibration device, to output torque from the magnetic-hydraulic double-suspension bearing experiment table.

2. The magnetic-hydraulic double-suspension bearing experiment table according to claim 1, wherein one side of any one of the two radial stators for the magnetic-hydraulic double-suspension bearing is processed with a stop that cooperates with the left supporting part of the fixed bracket and the right supporting part of the fixed bracket, and the stop is used to ensure any one of the two radial stators for the magnetic-hydraulic double-suspension bearing is concentric with the left supporting part of the fixed bracket and the right supporting part of the fixed bracket.

3. The magnetic-hydraulic double-suspension bearing experiment table according to claim 1, wherein four blind holes are uniformly processed on the left supporting part of the fixed bracket and the right supporting part of the fixed bracket; four through holes are uniformly processed on the left radial end cover for the magnetic-hydraulic double-suspension bearing and the right radial end cover for the magnetic-hydraulic double-suspension bearing, the left radial end cover for the magnetic-hydraulic double-suspension bearing and the right radial end cover for the magnetic-hydraulic double-suspension bearing are respectively connected to the left supporting part of the fixed bracket and the right supporting part of the fixed bracket by screws.

4. The magnetic-hydraulic double-suspension bearing experiment table according to claim 1, wherein four through holes are uniformly processed on the bell hood and the left radial end cover for the magnetic-hydraulic double-suspension bearing, and the bell hood and the left radial end cover for the magnetic-hydraulic double-suspension bearing are fixedly connected to the blind holes of the left supporting part of the fixed bracket by long screws.

5. The magnetic-hydraulic double-suspension bearing experiment table according to claim 4, wherein four notches are uniformly processed on the bell hood and the left radial end cover for the magnetic-hydraulic double-suspension bearing to facilitate disassembling of the countersunk screws for fixing the radial stator for the magnetic-hydraulic double-suspension bearing on the left to the left supporting part of the fixed bracket.

* * * * *